US008976262B2

(12) United States Patent
Ho et al.

(10) Patent No.: US 8,976,262 B2
(45) Date of Patent: Mar. 10, 2015

(54) METHODS OF CONNECTING NETWORK-BASED CAMERAS TO VIDEO STATIONS, AND CORRESPONDING VIDEO SURVEILLANCE SYSTEMS, VIDEO STATIONS, AND NETWORK-BASED CAMERAS

(75) Inventors: Ka Ho Ho, Hong Kong (CN); Ching Hok Tse, Hong Kong (CN); Ka Chun Lu, Hong Kong (CN)

(73) Assignee: Signal Communications Limited, Hong Kong (CN)

( * ) Notice: Subject to any disclaimer, the term of this patent is extended or adjusted under 35 U.S.C. 154(b) by 24 days.

(21) Appl. No.: 13/994,382

(22) PCT Filed: Feb. 14, 2012

(86) PCT No.: PCT/CN2012/000174
§ 371 (c)(1),
(2), (4) Date: Jun. 14, 2013

(87) PCT Pub. No.: WO2012/174845
PCT Pub. Date: Dec. 27, 2012

(65) Prior Publication Data
US 2013/0265422 A1    Oct. 10, 2013

(30) Foreign Application Priority Data

Jun. 24, 2011   (HK) .................................. 11106546

(51) Int. Cl.
*H04N 5/228*   (2006.01)
*H04N 7/18*   (2006.01)
(Continued)

(52) U.S. Cl.
CPC ................ *H04N 7/183* (2013.01); *H04L 67/16* (2013.01); *H04L 63/10* (2013.01)
USPC .................. 348/222.1; 348/143; 348/207.99; 348/207.1; 348/207.11

(58) Field of Classification Search
USPC ......... 348/143, 222.1, 207.1, 207.99, 207.11; 455/39, 40, 41.2, 557, 556.1, 426.1, 455/426.2; 709/201–203; 340/571, 539.1
See application file for complete search history.

(56) References Cited

U.S. PATENT DOCUMENTS 6,909,457 B1    6/2005   Fukasawa
8,032,084 B2 *  10/2011  Demirbasa et al. .......... 455/41.2
(Continued)

FOREIGN PATENT DOCUMENTS

CN    101472146 A    7/2009
CN    101945086 A    1/2011
(Continued)

OTHER PUBLICATIONS

International Search Report for PCT/CN2012/000174 (Apr. 18, 2012).
(Continued)

*Primary Examiner* — Yogesh Aggarwal
(74) *Attorney, Agent, or Firm* — Millen, White, Zelano & Branigan, P.C.

(57) ABSTRACT

Methods of connecting network-based cameras to video station such that the ownership between the network-based camera with the respective connected socket can be locked, such that at any time, each of the at least one socket can lock ownership of only one network-based camera, and receives video from the only one network-based camera with ownership locked by the respective socket. As the socket of the current invention can now engage into "locking" relationship with only one network-based camera with camera-identification tag acceptable to the video station, and preferably with the lock key, the chance of spoofing can be substantially reduced.

30 Claims, 13 Drawing Sheets

(51) Int. Cl.
*H04L 29/08* (2006.01)
*H04L 29/06* (2006.01)

(56) References Cited

U.S. PATENT DOCUMENTS

| | | |
|---|---|---|
| 2006/0136972 A1 | 6/2006 | Metzger |
| 2006/0142005 A1 | 6/2006 | Takaluoma |
| 2009/0167527 A1 | 7/2009 | Wang et al. |
| 2010/0208082 A1 | 8/2010 | Buchner et al. |
| 2011/0090347 A1 | 4/2011 | Buckner et al. |
| 2011/0149080 A1* | 6/2011 | Jain et al. ............... 348/159 |

FOREIGN PATENT DOCUMENTS

| | | |
|---|---|---|
| EP | 2337356 A2 | 6/2011 |
| WO | 20101080639 A2 | 7/2010 |

OTHER PUBLICATIONS

Supplemental European Search Report dated Nov. 14, 2014 corresponding to European Patent Application No. 12802408.0.

\* cited by examiner

METHODS OF CONNECTING NETWORK-BASED CAMERAS TO VIDEO STATIONS, AND CORRESPONDING VIDEO SURVEILLANCE SYSTEMS, VIDEO STATIONS, AND NETWORK-BASED CAMERAS

FIELD OF THE INVENTION

This invention relates to video surveillance systems, particularly those with IP-based digital cameras and digital video recorders.

BACKGROUND OF THE INVENTION

Video surveillance systems play an important role in many different areas such as crime prevention, business management and traffic monitoring. Surveillance systems can be found almost everywhere such as banks, casinos, airports, military installations, and stores.

Due to better resolution and output quality, there is a growing trend of replacing analog cameras by digital cameras in the surveillance field. In a digital video surveillance system, network- or IP-based cameras are used instead of traditional analog cameras, which capture images and convert to digital formats right away and transmit the video data to a network-based video recorder (NVR) or video station over network, typically over ethernet under IP protocol.

Although these network- or IP-based surveillance systems are gaining popularity, there are some shortcomings. First of all, the installation of IP-based cameras is more complicated than analog cameras. The operator needs extensive network knowledge to configure each connected camera. Whenever there is a new camera connected to the system, the setup involves a lot more configuration changes than those of traditional analog surveillance system, for example prevention of conflicts of IP addresses. The second issue concerns security. Because video data from the IP-based cameras is sent over a shared network, hackers can easily access the cameras by connecting to the shared network and acquire the sensitive video data, or replace video images sent from the camera to the NVR. In fact there are tools readily available on the Internet for these. FIG. 1 shows a possible scenario in which a hacker replaces video images sent from the camera to the NVR by using a computer with the same IP and MAC addresses of those of the IP-camera registered at the video station, which is generally known as "spoofing".

Therefore, there is a need to devise more secure video surveillance systems that utilize network-based, or more specifically IP-based cameras, and NVR or video stations.

OBJECTS OF THE INVENTION

Therefore, it is an object of this invention to resolve at least one or more of the problems as set forth in the prior art. Particularly, it is an object of the current invention to provide video surveillance systems using network-based cameras and video stations with easier installation and/or improved security. As a minimum, it is an object of this invention to provide the public with a useful choice.

SUMMARY OF THE INVENTION

Accordingly, this invention provides a method of connecting at least one network-based camera to a video station, said video station having at least one socket for connecting said network-based camera. The method of this invention includes the steps of:

a) sending a camera-advertising signal from the network-based camera to the video station for notifying the presence of the network-based camera, said camera-advertising signal includes a camera-identification tag for identification of the network-based camera;

b) if the network-based camera is in an unlock state, locking ownership of the network-based camera with the respective connected socket; and c) if the network-based camera is in a lock state and is not locked by the respective socket, terminating connection between the network-based camera and the video station such that at any time, each of the at least one socket can lock ownership of only one network-based camera; and receives video from the only one network-based camera with ownership locked by the respective socket.

Preferably, the method of this invention further includes the steps of:

a1) after receiving the camera-advertising signal, determining whether the camera-identification tag is acceptable to the video station; and a2) if the camera identification tag is not acceptable to the video station, terminating connection between the network-based camera and the video station.

Preferably, the steps b) and c) above include the steps of sending an ownership-locking-query signal from the video station to the network-based camera for querying whether ownership of the network-based camera with the respective connected socket can be locked;

after the network-based camera receives the ownership-locking-query signal, sending an accept-locking signal from the network-based camera to the video station if the network-based camera is in the unlock state; or sending a reject-locking signal from the network-based camera to the video station if the network-based camera is in the lock state and is not locked by the respective socket;

if the accept-locking signal is sent from the network-based camera to the video station, locking ownership of the network-based camera with the respective connected socket and establishing a video connection for sending video from the network-based camera to the video station; and if the reject-locking signal is sent from the network-based camera to the video station or if the camera-identification tag is not acceptable to the video station, terminating connection between the network-based camera and the video station.

More preferably, the ownership-locking-query signal includes a lock key for decrypting data transmission between the network-based camera and the video station. With the provision of the ownership-locking-query signal, the method of this invention may additionally further include the step of broadcasting a station-discovery signal from the video station before the camera-advertising signal is sent from the network-based camera to the video station, said station-discovery signal including a station-identification tag for the identification of the video station. Even more preferably, the ownership-locking-query signal further includes any one of the camera-identification tag, the station-identification tag, a set of assigned networking settings, or their combinations, and on this basis, the step of locking ownership of the network-based camera by the respective connected socket includes the steps of
  recording at least one of the following:
    recording the camera-identification tag at the respective connected socket; and
    recording the station-identification tag at the network-based camera
  selecting a set of unique networking settings at the video station as the assigned networking settings in the ownership-locking signal; and optionally, updating the network-based camera with the set of assigned networking settings.

Preferably, the camera-advertising signal further includes any one of a set of camera networking settings, camera-locking status, or their combinations.

Optionally, the method of this invention further including the steps of:
  sending a heart-beat signal from the network-based camera to the respective connected socket for maintaining ownership of the network-based camera with the respective connected socket; and
  if the heart-beat signal is not received within a predetermined period of time, unlocking ownership of the network-based camera with the respective connected socket and terminating connection between the network-based camera and the respective connected socket.

Preferably, the network-based camera is connected to said at least one socket through a network cable.

It is another aspect of this invention to provide a video surveillance system having at least one network-based camera and a video station incorporating any one of the above methods.

It is yet another aspect of this invention to provide a method of controlling connection between at least one network-based camera to a video station, in which a camera-advertising signal is sent from the network-based camera to the video station for notifying the presence of the network-based camera. The camera-advertising signal includes a camera-identification tag for identification of the network-based camera, said video station having at least one socket for connecting said network-based camera. The method includes the steps of:
  1) if the network-based camera is in an unlock state, locking ownership of the network-based camera with the respective connected socket; and
  2) if the network-based camera is in a lock state and is not locked by the respective socket, terminating connection between the network-based camera and the video station such that at any time, each of the at least one socket can lock ownership of only one network-based camera; and
  receives video from the only one network-based camera with ownership locked by the respective socket.

It is a further aspect of this invention to provide a video station for a video surveillance system incorporating the above method.

This invention further provides a method of connecting at least one network-based camera to a video station, said video station:
  having at least one socket for connecting said network-based camera,
  can locking ownership of the network-based camera with the respective connected socket if the network-based camera is in an unlock state, and provide the network-based camera with a lock key for decrypting data transmission between the network-based camera and the video station and
  can terminate connection between the network-based camera and the video station if the network-based camera is in a lock state and is not locked by the respective socket
and the method includes the steps of:
  a) sending a camera-advertising signal from the network-based camera to the video station for notifying the presence of the network-based camera, said camera-advertising signal includes a camera-identification tag for identification of the network-based camera;
  b) recording the lock key at the network-based camera if an ownership-locking-query signal from the video station is received, and the network-based camera is in a unlock state
such that at any time, each of the at least one socket
  can lock ownership of only one network-based camera; and
  receives video from the only one network-based camera with ownership locked by the respective socket.

It is another aspect of this invention to provide a network-based camera for a video surveillance system incorporating the above method.

BRIEF DESCRIPTION OF THE DRAWINGS

Preferred embodiments of the present invention will now be explained by way of example and with reference to the accompanying drawings in which.

DETAILED DESCRIPTION OF THE PREFERRED EMBODIMENTS

Figure 1:
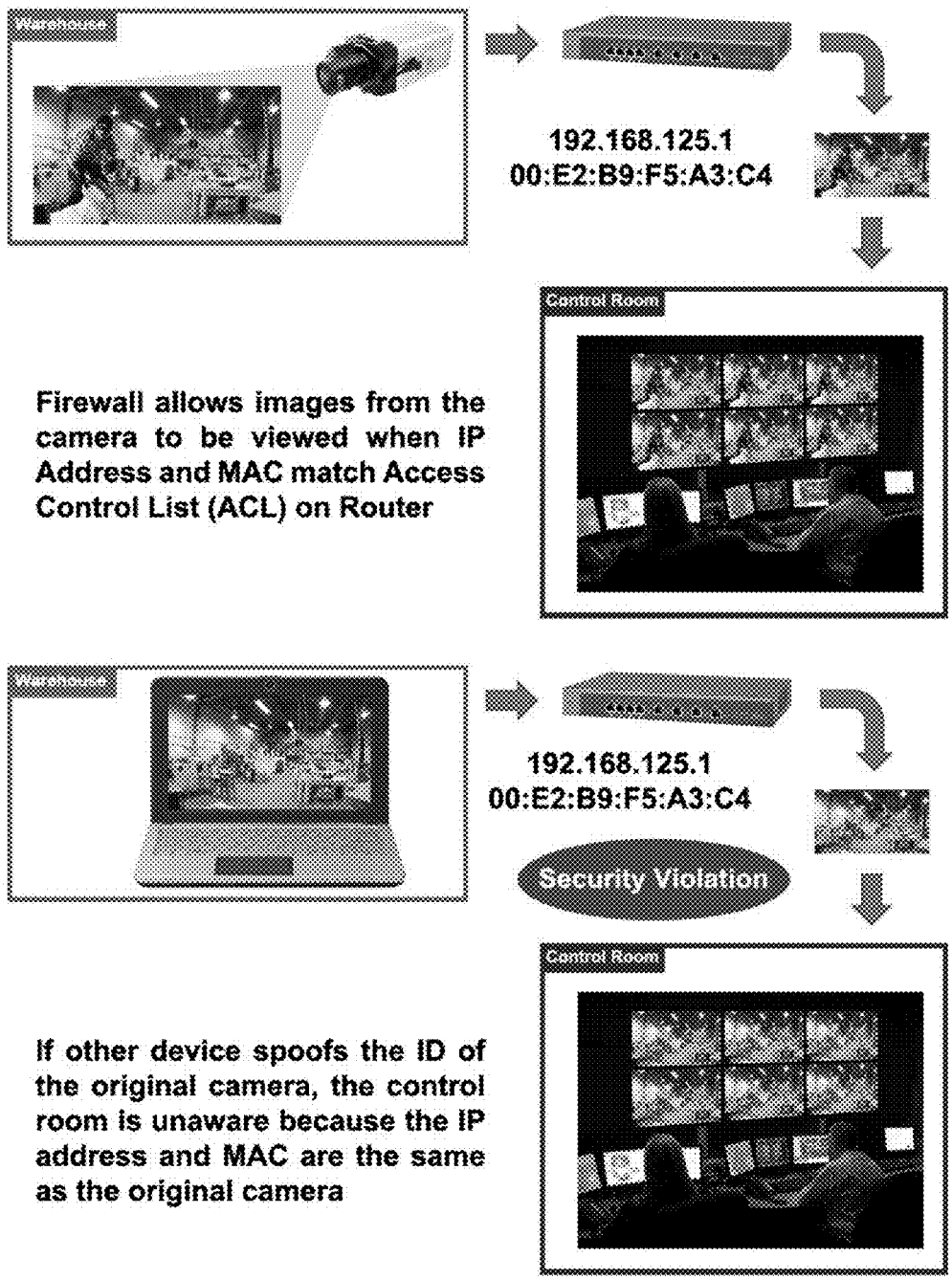
FIG. 1 shows how fake video images can be sent to a video station by "spoofing"

This invention is now described by way of examples with reference to the figures in the following paragraphs. Objects, features, and aspects of the present invention are disclosed in or are apparent from the following description. It is to be understood by one of ordinary skilled in the art that the present discussion is a description of exemplary embodiments only, and is not intended as limiting the broader aspects of the present invention, which broader aspects are embodied in the exemplary constructions. List 1 is a list showing the parts and respective reference numerals in the figures.

| List 1 | |
| --- | --- |
| Reference numeral | Part name |
| 10 | video surveillance system |
| 12 | network-based camera |
| 14 | video station |
| 16 | socket |
| 20 | video recorder |

Figure 2:
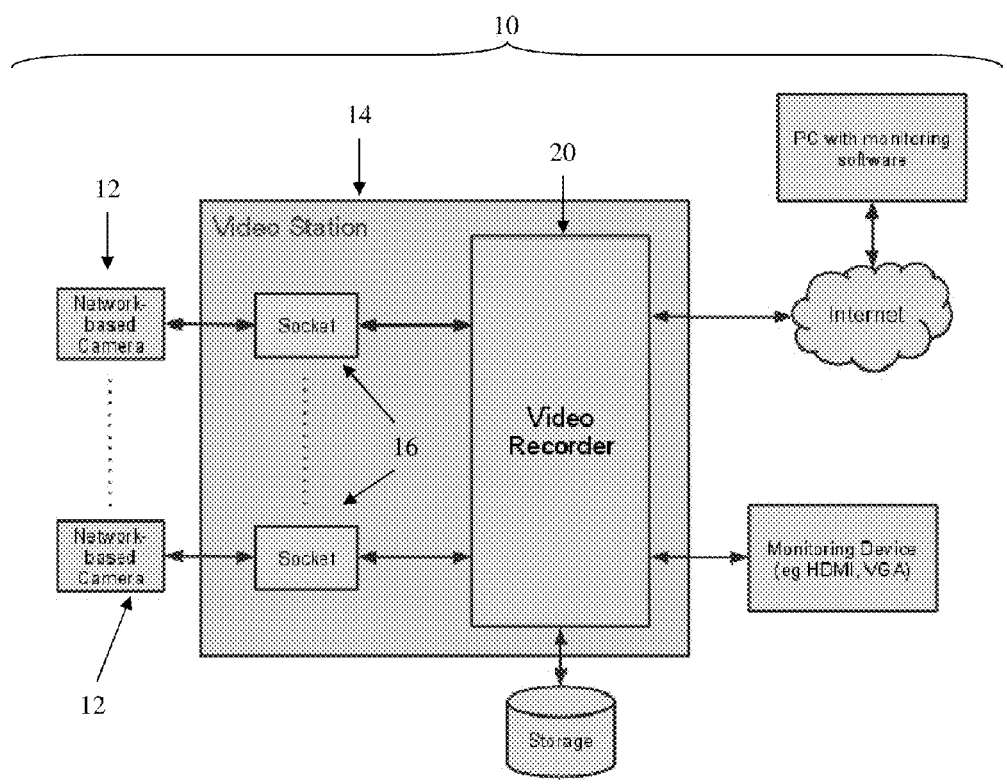
FIG. 2 shows the general system architecture of the video surveillance system of the current invention.

Referring to FIG. 2, the video surveillance system 10 has two components, at least one network-based camera 12, and at least one video station 14. The video station 14 has at least one socket 16 for connecting to the network-based camera 12, and a video recorder 20. The video surveillance system 10 can have as many network-based cameras 12, video stations 14, and sockets 16 as desired, which is to be determined according to the usage of the video surveillance system 10 depending on various factors including the area to be covered, complexity of the venue, and so on, subject to resources available. The sockets 16 in the context of this invention refer to physical sockets that can connect with the network-based cameras 12 physically, for example through a wired connection. The sockets 16 are not virtual sockets in typical networking that connect to various network devices. The video station 14 is connected to the internet, monitoring device, and storage if desired with known technologies, for example RJ-45 sockets and cables, VGA or HDMI sockets and cables, USB, IEEE1394 or eSATA sockets and cables.

The network-based cameras 12 and the video station 14 are each implemented with suitable software control modules, for example in the form of software, for controlling their connections. These will be described in detail in the following paragraphs.

Figure 3:
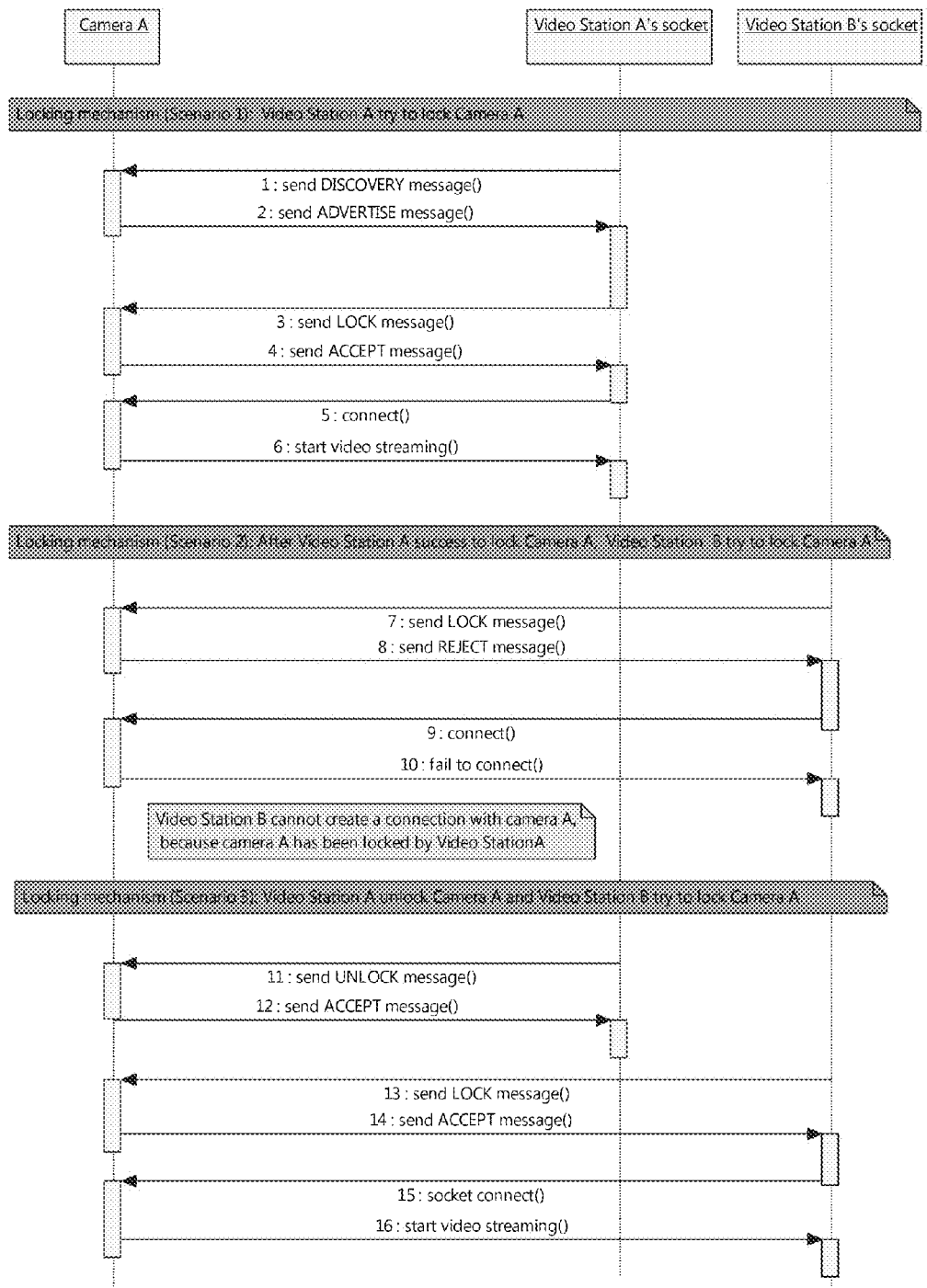
FIG. 3 shows the flow chart of how a network-based camera is locked by one socket of the video station of this invention.

FIG. 3 shows a flow chart explaining how a network-based camera 12 is locked by one socket 16 of the video station 14 of this invention. When a network-based camera 12 is connected to one socket 16, a camera-advertising signal is sent from the network-based camera 12 to the video station 14 for notifying the presence of the network-based camera 12. This camera-advertising signal includes a camera-identification tag for identification of the network-based camera 12. This camera-identification tag can be any desirable unique code that can identify individual network-based camera 12, preferably at hardware level for example production serial number of the network-based camera 12. If the network-based camera is in an unlock state, ownership of the network-based camera 12 is locked with the respective connected socket 16. If the network-based camera 12 is in a lock state and is not locked by the respective socket, connection between the network-based camera 12 and the video station 14 is terminated.

Before the network-based camera 12 enters the lock state, the camera-advertising signal can be sent by the network-based camera 12 actively, that is, can be sent periodically regardless whether the network-based camera 12 detects connection with the socket 16, or even whether the network-based camera 12 detects connection to a network. Alternatively, the camera-advertising signal can be sent by the network-based camera 12 passively, that is, can be sent only when the network-based camera 12 detects connection with the socket 16, or when the network-based camera 12 detects connection to a network.

Optionally, after receiving the camera-advertising signal, the video station 14 then determines whether the camera-identification tag is acceptable to the video station 14, for example, by checking whether the camera-identification tag is contained in a list, which can be stored in the video station 14 or accessible to the video station 14 through a network connection. If the camera-identification tag is acceptable to the video station and, as described above, if the network-based camera is in an unlock state, ownership of the network-based camera 12 is locked with the respective connected socket 16. Otherwise, if the camera-identification tag is not acceptable to the video station, connection between the network-based camera 12 and the video station 14 is terminated.

Other than the camera-identification tag, the camera-advertising signal can optionally contain a field indicating the locking status of the network-based camera 12, i.e. indicating whether the network-based camera 12 is in lock or unlock state for connection to the a socket of the video station 14. This is desirable as the video station can immediately determine whether the ownership of the network-based camera 12 with the respective connected socket 16 can be locked, or connection with the network-based camera 12 with the video station 14 should be determined.

If the video station 14 is not aware of the locking state of the network-based camera 12, for example from the camera-identification tag, then the following processes are applicable. Specifically, an ownership-locking-query signal is sent from the video station 14 to the network-based camera 12 for querying whether ownership of the network-based camera 12 with the respective connected socket 16 can be locked. After the network-based camera 12 receives the ownership-locking-query signal, if the network-based camera 12 is in an unlock state, an accept-locking signal is sent from the network-based camera 12 to the video station 14, the ownership of the network-based camera 12 with the respective connected socket 16 is then locked and a video connection is established for sending video from the network-based camera 12 to the video station 14. Otherwise, if the network-based camera 12 is in a lock state and is not locked by the respective socket, a reject-locking signal is sent from the network-based camera 12 to the video station 14, and connection between the network-based camera 12 and the video station 14 is terminated. The connection between the network-based camera 12 and the video station 14 is also terminated if the camera-identification tag of the network-based camera 12 is determined to be unacceptable to the video station 14. Through the above operations, each of the socket 16 can lock ownership of only one network-based camera, and receives video from the only one network-based camera with ownership locked by the respective socket. Having said the above, the above processes can still be implemented if the video station 14 is aware of the locking state of the network-based camera 12 as back up. It should be note that while the network-based camera 12 is in a lock state, the respective connected socket 16 may still send the ownership-locking-query signal to the network-based camera 12, for example, for updating the network settings, the lock key, or any necessary settings. In such a case, the reject-locking signal, which will terminate connection between the network-based camera 12 and the video station 14, should not be sent.

Optionally, a station-discovery signal can be broadcasted from the video station 14 before the camera-advertising signal is sent from the network-based camera to the video station 14. In such a case, a camera-advertising signal can be sent after receiving the station-discovery signal. This station-discovery signal includes a station-identification tag for the identification of the video station 14. This station-identification tag can be any desirable unique code that can identify individual video station 14, preferably at hardware level for example production serial number of the video station 14. The use of this station-identification tag will be explained later.

Other than the camera-identification tag, the ownership-locking-query can also include a lock key for decrypting data transmission between the network-based camera 12 and the video station 14. All data transmission including video and various control messages including the heart-beat signals. However, preferably only the control messages are encrypted so as to reduce network overhead and processing power requirements at the network-based camera 12 and the video station 14. Various encryptions can be used, for example RC4 (http://en.wikipedia.org/wiki/RC4), WEP (http://en.wikedia.org/wiki/Wired Equivalent Privacy), and DES (http://en.wikipedia.org/wiki/Data Encryption Standard). The lock key can be generated by various methods, for example UUID (http://en.wikipedia.org/wiki/UUID) or OUI (http://en.wikipedia.org/wiki/Organizationally Unique Identifier), which can be generated on-demand or stored in the video station 14. Generation of the lock key in the video station 14 on-demand is more preferred as this would be less prone to security breach.

Additionally, the ownership-locking-query signal can further include any one of the camera-identification tag, the station-identification tag, a set of assigned networking settings, or their combinations. The camera-identification tag can serve for additional checking purpose, while the use of the station-identification tag and the set of assigned networking settings will be described later.

The "locking" of the ownership of the network-based camera 12 with the respective connected socket 16 can be implemented in various different manners. For example, the network-based camera 12 and the connected socket 16 may each be associated to a virtual electronic locking status which can be in either "unlock" or "lock", for which this virtual electronic status can be as simple as a true/false field. During the locking of the ownership, the respective locking status of the network-based camera 12 and the connected socket 16 is updated to "lock". To enhance security, it is even more preferred that the video station 14 selects a set of unique networking settings as the set of assigned networking settings in the ownership-locking-query signal, such that the networking settings of the network-based camera 12 can be updated during the locking process. The selection and updating of the network settings, which may include IP address, subnet mask, DNS server address, and so on can follow the standard DHCP procedures or static IP assignment procedures.

Optionally the camera-identification tag is recorded at the video station 14 and/or the station-identification tag is recorded at the network-based camera 12 during locking of the ownership. This can be useful to enhance subsequent checking capabilities and security. In order to ensure that the connection between the network-based camera 12 and the video station 14 is intact after some time, it is preferred to send a heart-beat signal from the network-based camera 12 to the video station 14. If this heart-beat signal is not received in a predetermined period of time, say every 5 to 30 seconds, then the ownership of the network-based camera 12 and the respective connected socket 16 changes to "unlock", i.e. the virtual electronic locking status of the network-based camera and the connected socket 16 is changed from "lock" to "unlock". The change of the locking status can be done by internal checking for example as in the case of using the heart-beat signal, or by sending a unlock signal to the network-based camera 12 and/or the connected socket 16 under user control. If the camera-identification tag is recorded at the video station 14 and/or the station-identification tag is recorded at the network-based camera 12, these tags can act as extra checking for the security of the connection, for example, in preventing spooling as these tags are associated to the network-based camera 12 and the video station 14 at hardware level. The handling of heart-beat signal is known in the field and will not be further described.

It should be noted that the "locking" of the ownership is done between the network-based camera 12 with the respective connected socket 16, but not between the network-based camera 12 with the video station 14. One consequence of this is that at any time, each of the at least one socket can lock ownership of only one network-based camera, and receives video from the only one network-based camera with ownership locked by the respective socket. That is, even if a network switch or repeater with multiple network ports is connected to a socket 16 of the video station 14, and each of these multiple network ports is connected to one network-based camera 12, only one of these network-based cameras 12 is able to engage with the socket 16 into the "locking" relationship and therefore only video from this "locked" network-based camera 12 is received by the socket 16. Preferably, the locked socket 16 stops looking for unlock network-based camera 12, for example stops sending the station-discovery signal, once the socket 16 enters into the lock status. This is different from the current approach which generally utilizes DHCP as the network connection setup protocol, which allows multiple cameras to be connected to a single network socket on existing video stations. Such current approach at least has the problem of quality drop if too many cameras are connected to a single socket.

The network connection between the socket 16 and the network-based camera 12 can be wireless or wired. In the case of wireless connection, where there are typically multiple channels, each physical socket 16 can allow connection for one channel only so as to achieve the effect that one socket 16 locks ownership of only one network-based camera 12, and receive video from the only one network-based camera 12 with ownership locked by the respective socket 16 at any time. However, wired connection is preferred which can further enhance the security of the video surveillance system 10. As the socket 16 of the current invention can now engage into "locking" relationship with only one network-based camera 12 with camera-identification tag acceptable to the video station 14, and preferably with the lock key, wired connection can substantially reduce the chance of "spoofing", as the network-based camera 12 can then be traced physically by the wired connection. By contrast, current network-based video surveillance systems utilize network-based cameras, which allow multiple cameras to be connected to one socket, and/or do not use a lock key sent from the video station 14 as in the current invention. Accordingly, the chance of spoofing is higher, and it can be difficult to trace the actual physical location of the network-based camera.

As one socket 16 can now connect to one network-based camera 12 only, the setting up of the system is simpler than currently available network-based video surveillance systems, which allow multiple cameras to be connected to one socket.

Figure 4A:
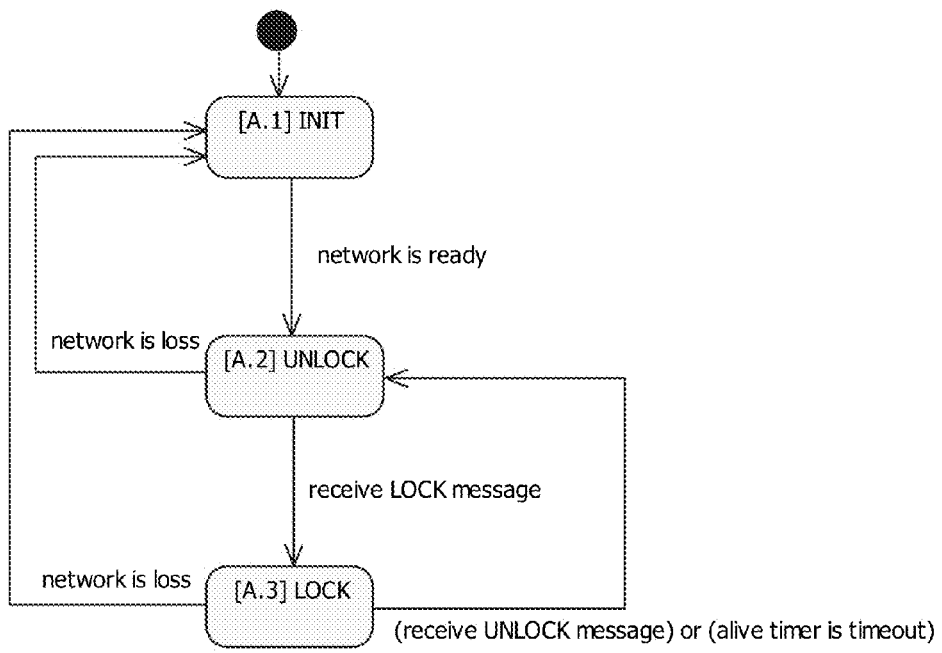
FIGS. 4a to 4d show the flow charts of the processes involved in the network-based camera for controlling its connection with the video station.
Figure 4B:
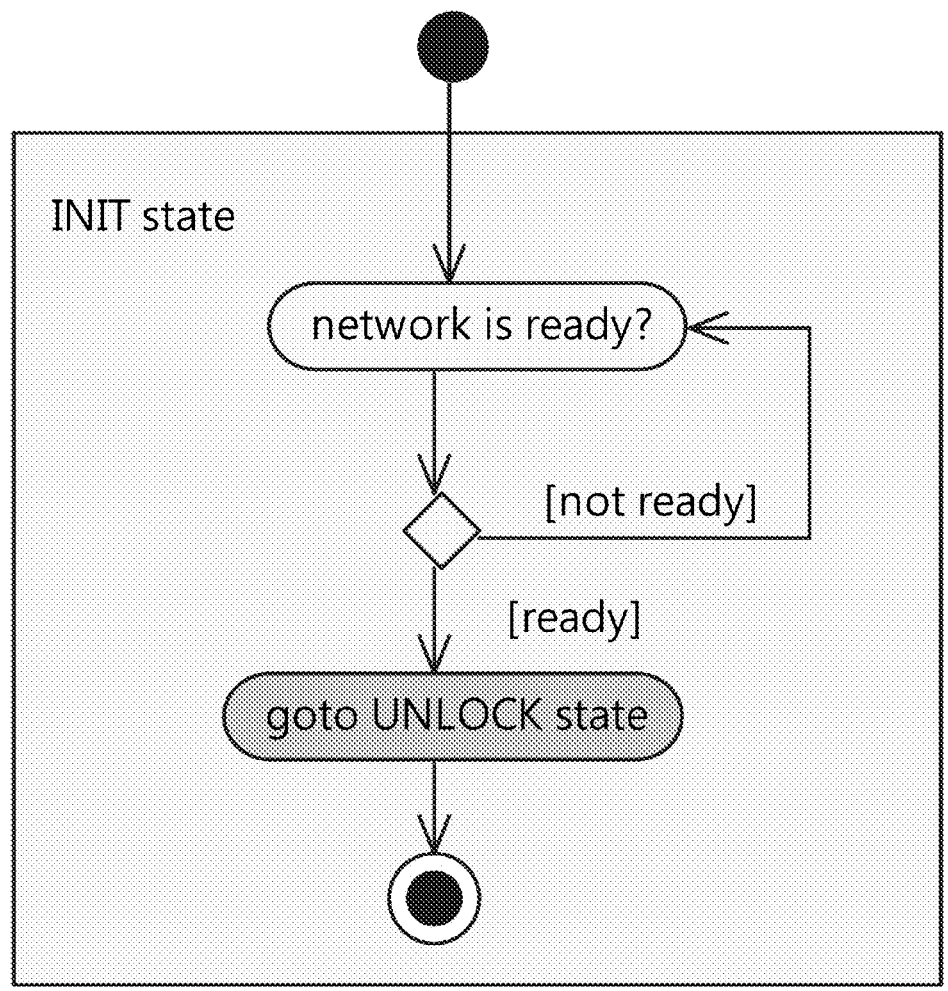

FIGS. 4a to 4d show exemplary flow charts of the processes involved in the network-based camera 12 for controlling the connection with the video station 14 that has implemented all of the above optional components of the video surveillance system 10 of this invention. Specifically, FIG. 4a shows the control of the locking status at the network-based camera 12, in which the network-based camera 12 goes to unlock state during initialization after checking that the network-based camera 12 is ready for network connection. If the ownership-locking-query signal message is received and the network-based camera 12 is in the unlock state, the network-based camera 12 then updates itself to lock state. This status is changed back to "unlock" if an unlock signal is received, network is lost or not ready as shown in FIG. 4b, or there is no response to the heart-beat signal sent by the network-based camera 12. Monitoring of the network status can be done by protocols like the Auto-negotiation of Ethernet Physical Layer Communication (http://en.wikipedia.org/wiki/Auto-negotiation).

Figure 4C:
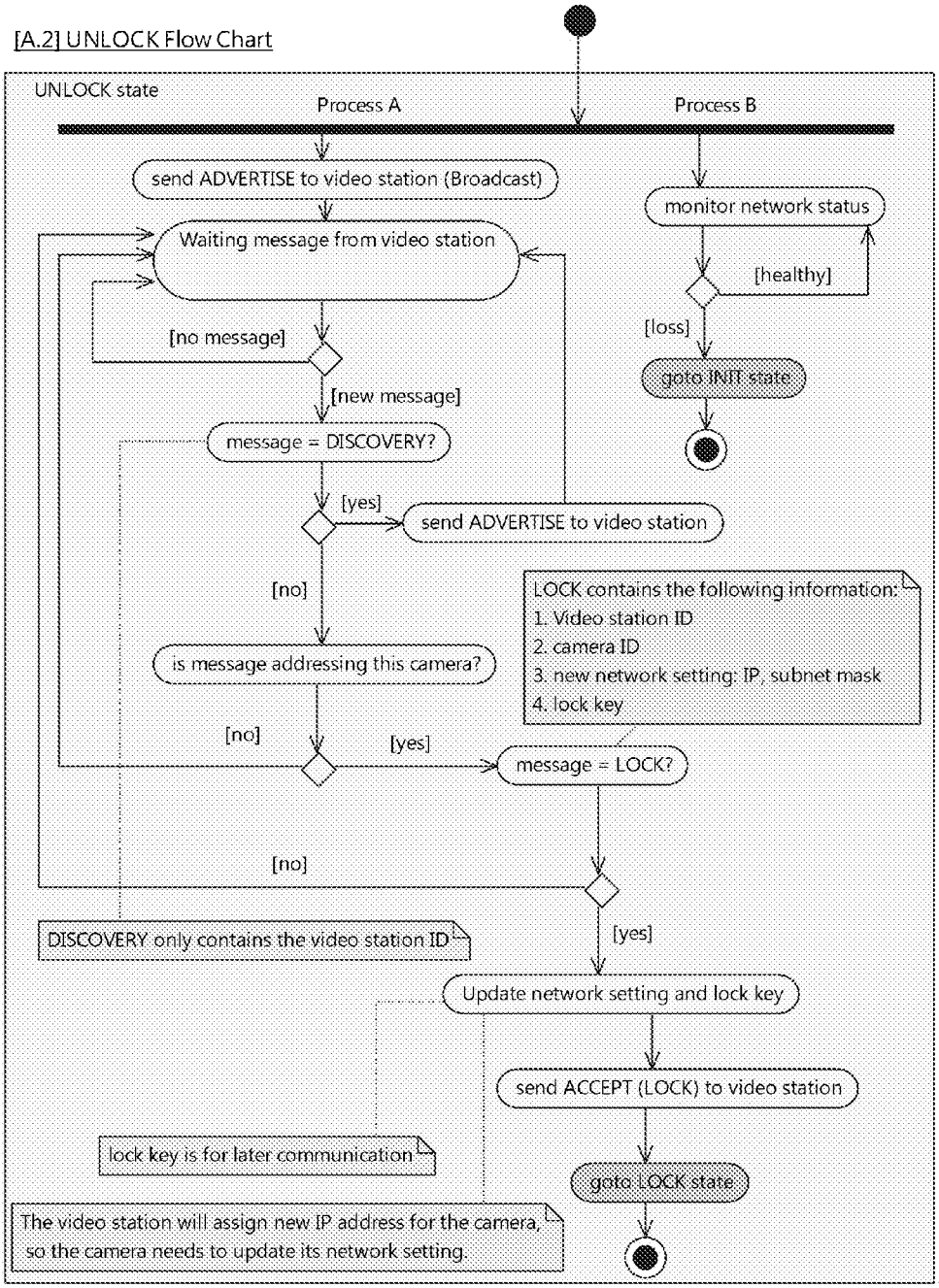

FIG. 4c shows various processes involved when the network-based camera 12 is in the unlock state, including
    sends the camera-advertising signal ADVERTISE from the network-based camera 12, and then waits for signals from the socket 16 of the video station 14;

if a message targeting the network-based camera 12 is received from the socket 16, and if this message is the ownership-locking-query signal LOCK, and if the network-based camera 12 is in the unlock state, the network-based camera 12 changes it status to the lock stage, updates its network settings, stores the lock key for subsequent data decryption, and sends an accept-locking signal ACCEPT LOCK to the socket 16 of the video station 14;

the network-based camera 12 will go to the state of waiting message from the socket 16 if one of the following happens:
1. no message is received from the socket 16;
2. message from the socket 16 is not intended for the network-based camera 12;
3. the ownership-locking-query signal LOCK is sent from the socket 16 but the network-based camera 12 is in the lock state;

if the network-based camera 12 is in the lock state and if an "unlock" message is received containing correct information, for example the correct camera-identification and station-identification tags, the network-based camera 12 updates its locking status to "unlock"

at all times, the network status is monitored, as described above.

Figure 4D:
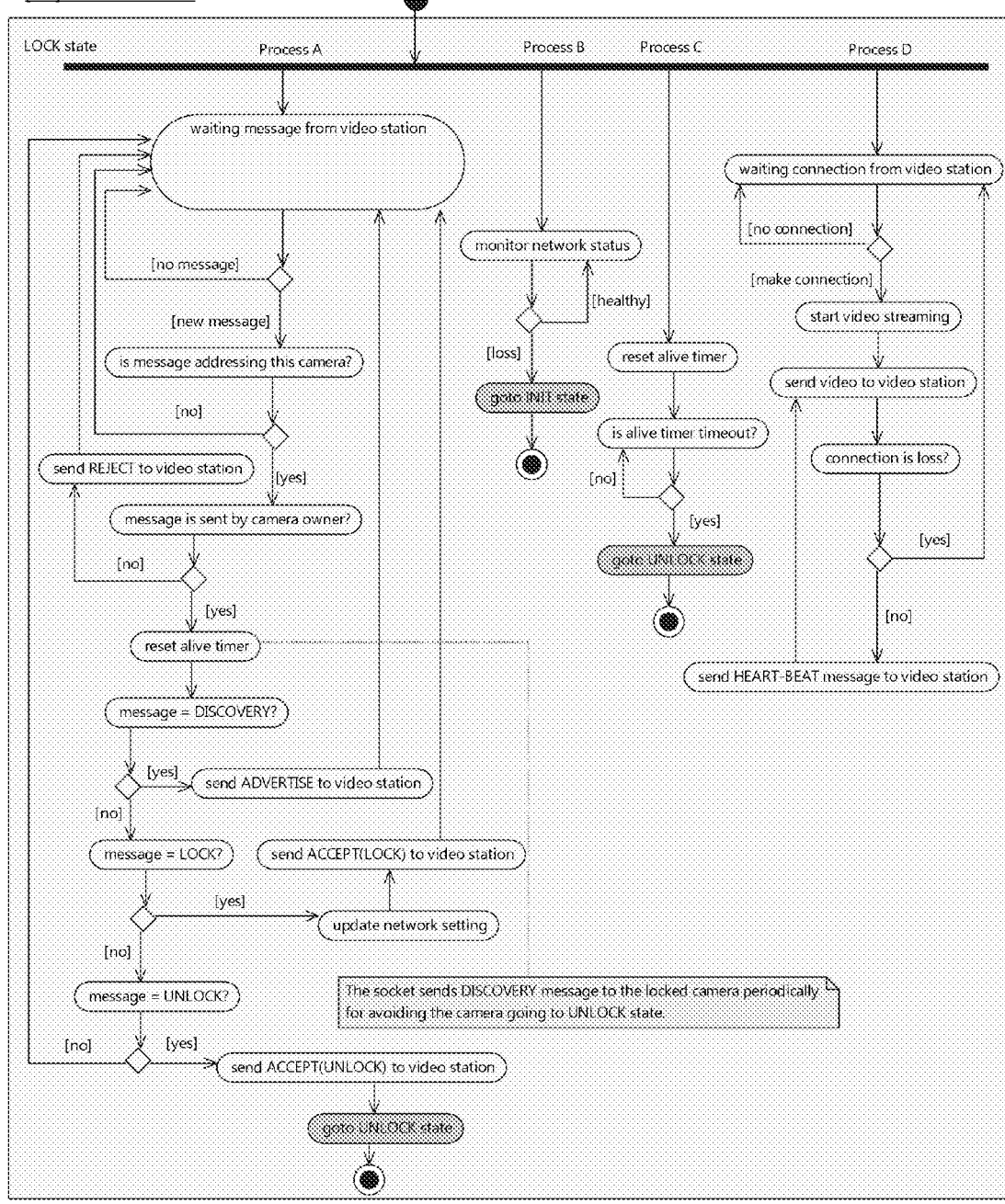
Figure 5A:
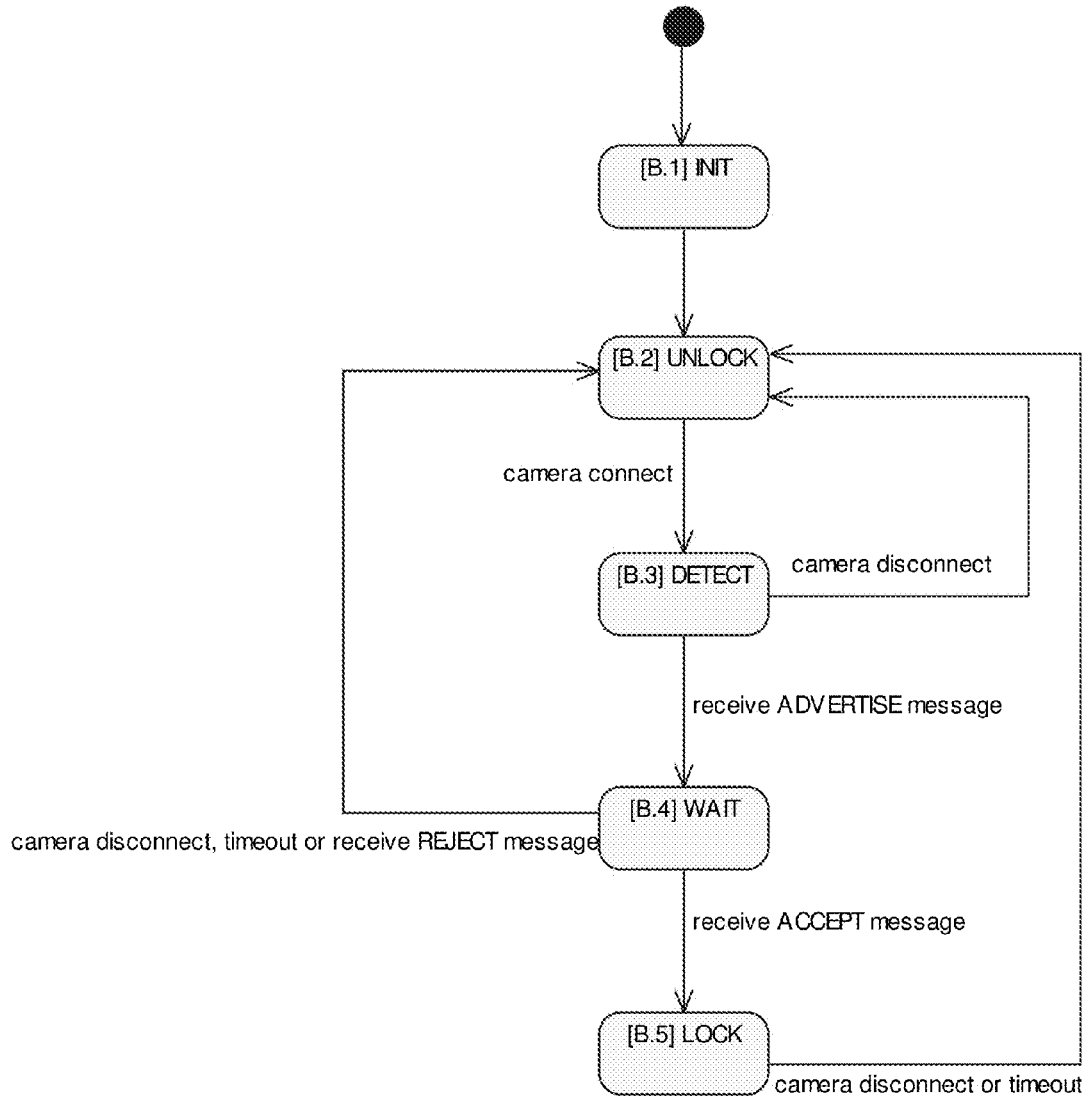
FIGS. 5a to 5f show the flow charts of the processes involved in the video station for controlling the connection of one socket with the IP-based camera.

FIG. 4d shows processes for monitoring the network status as above, and various processes involved when the network-based camera 12 is in the lock state, including the handling of the maintenance of "heart-beat" between the network-based camera 12 and the respective connected socket 16. As stated above, as these processes are known to the field, these processes will not be further described FIGS. 5a to 5f show exemplary flow charts of the processes involved in the video station 14 for controlling the connection with the network-based camera 12 that has implemented all of the above optional components of the video surveillance system 10 of this invention. Specifically, FIG. 5a shows the control of the locking status at each socket 16 of the video station 14, in which the socket 16 goes to unlock state during initialization after checking that the socket 16 is ready for network connection. The socket 16 goes into the lock state if the socket 16 is in an unlock state and receives an accept-locking signal from the network-based camera 12. The socket 16 goes into the unlock state if one of the following happens:
1. the network-based camera is detected to be not connected to the socket 16;
2. a reject-locking signal REJECT is received;
3. no heart-beat signal HEART-BEAT is received from the network-based camera 12 within a predetermined period of time.

Figure 5B:
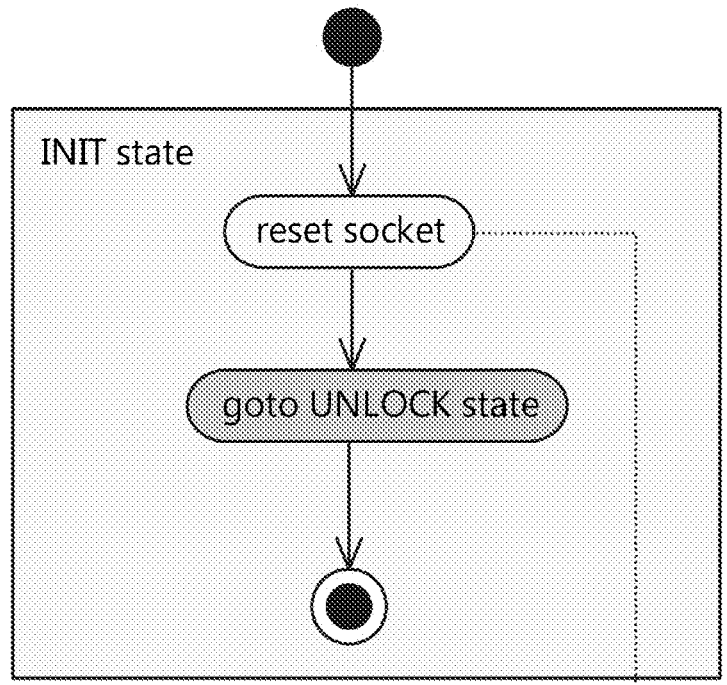
Figure 5C:
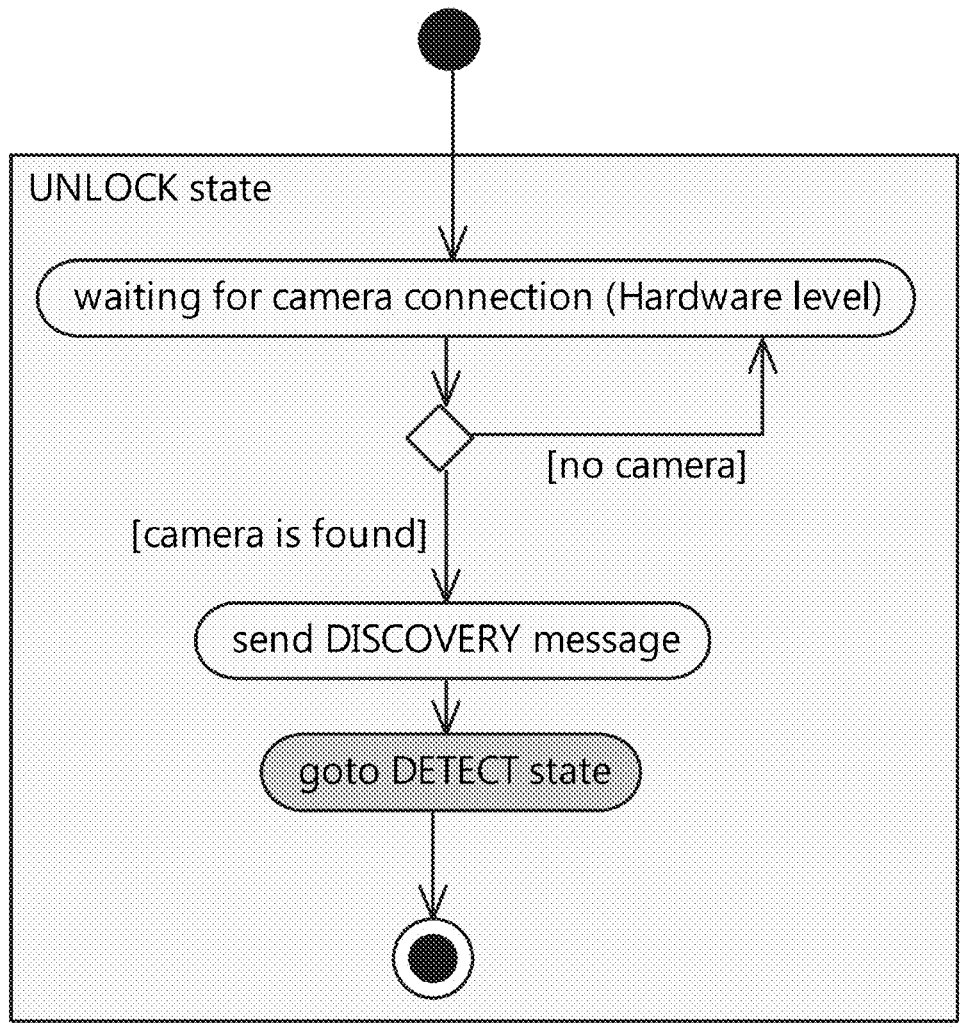

FIG. 5b shows that the socket 16 goes to unlock state during initialization. FIG. 5c shows the processes involved in the unlocking of the socket 16, which is triggered by the disconnection of the network-based camera 12 from the socket 16 at hardware level.

Figure 5D:
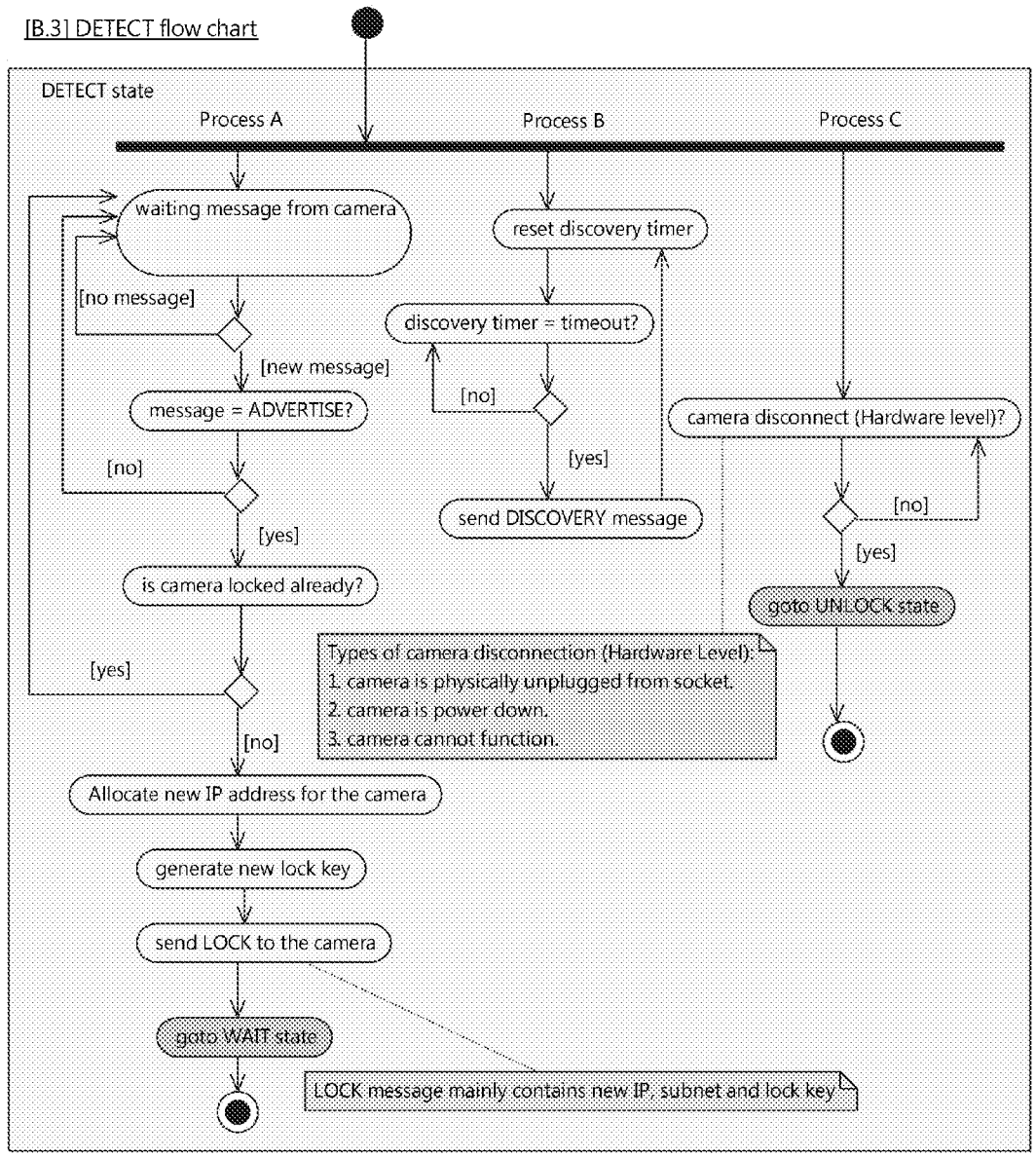

FIG. 5d shows various processes involved when the socket 16 of the video station 14 is in the state of detecting presence of network-based camera 12, including
waits for the camera-advertising signal ADVERTISE from the network-based camera 12;
if the socket 16 receives the camera-advertising signal ADVERTISE from the network-based camera 12, and if this signal indicates that the network-based camera 12 is unlock, then the video station 14 can allocate or assign a set of unique network settings. The ownership-locking-query signal LOCK can then be generated and sent to the network-based camera 12 for locking the ownership with the connected socket 16;
the station-discovery signal DISCOVERY will be sent periodically if there is no response from the connected network-based camera 12, or if there is no connection to any network-based camera 12 at all;
at all times, the connection status at hardware level is monitored, as described above.

Figure 5E:
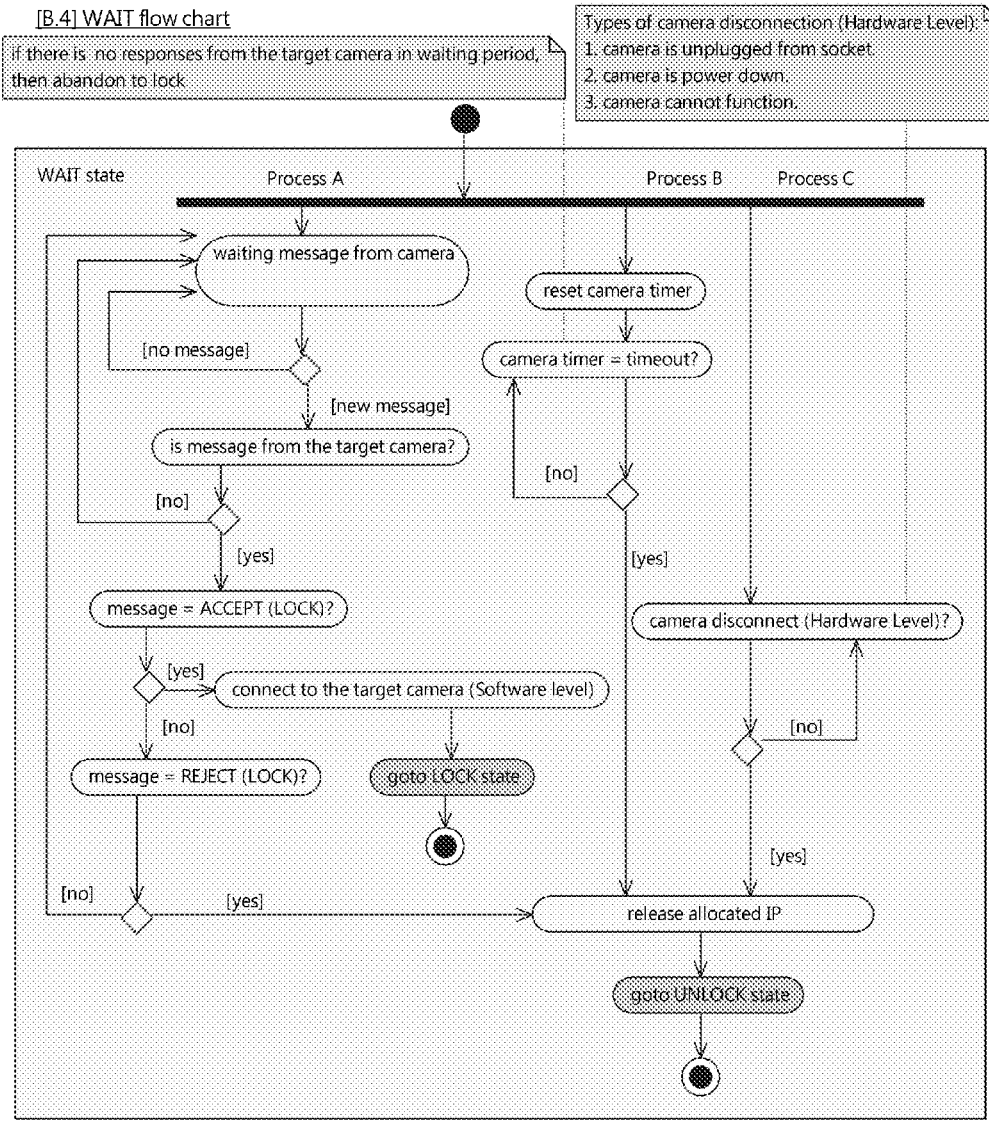

FIG. 5e show various processes involved after the ownership-locking-query signal LOCK is sent from the socket 16 to the network-based camera 12, including:
waits for the accept-locking signal ACCEPT LOCK or rejecting-locking signal REJECT from the network-based camera 12;
checks whether the accept-locking signal ACCEPT LOCK or rejecting-locking signal REJECT is from the target camera, for example, by comparing whether the camera-identification tag in this signal corresponds to that in the earlier sent ownership-locking-query signal;
if the signal is from the target camera, and if the signal is the accept-locking signal ACCEPT LOCK, connection with the network-based camera is established, and the socket 16 goes into the lock state with the network-based camera 12;
connection with the network-based camera 12 is terminated if one of the following happens:
  i. the signal is the reject-locking signal REJECT;
  ii. the network-based camera 12 is disconnected; or
  iii. the heart-beat maintenance processes resulted in a timeout;
the station-discovery signal DISCOVERY will be sent periodically if there is no response from the connected network-based camera 12, or if there is no connection to any network-based camera 12 at all;
at all times, the connection status on hardware level is monitored, as described above.

Figure 5F:
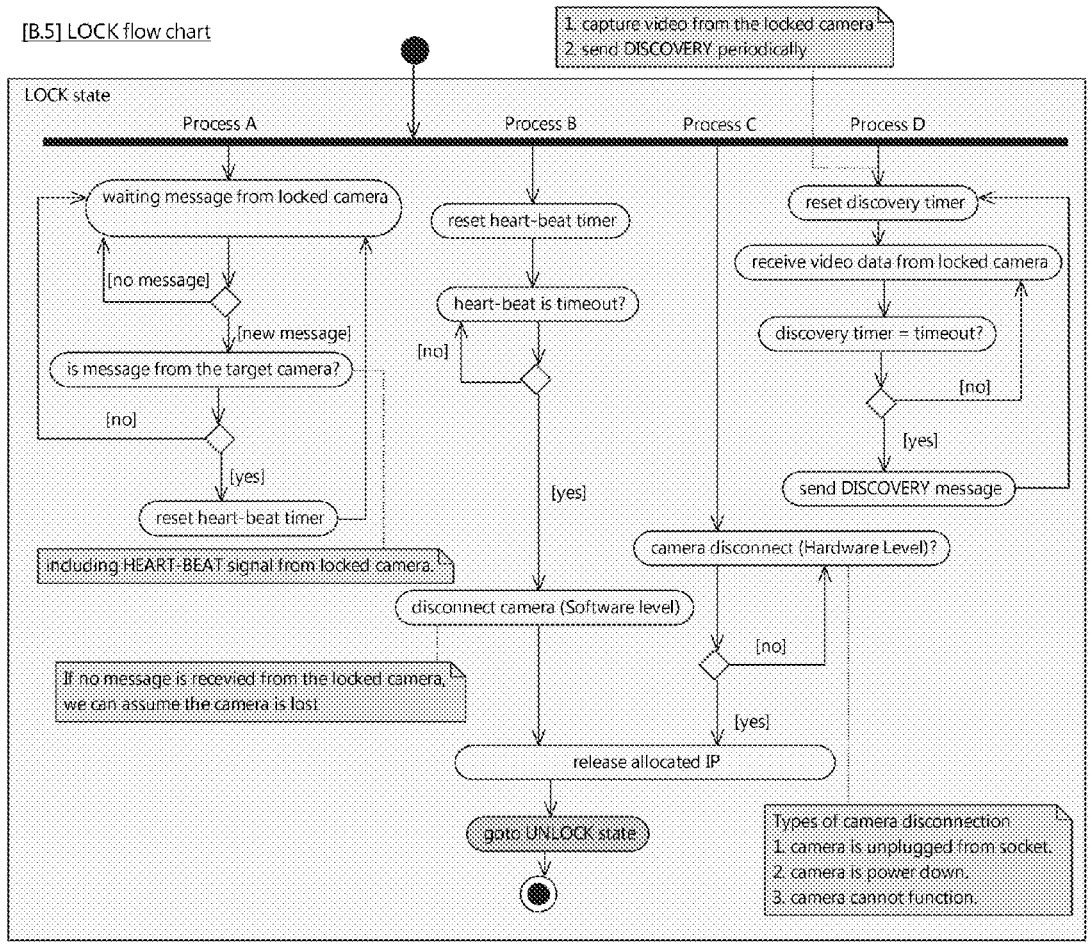

FIG. 5f describes the processes when the lock relationship is established between the network-based camera 12 and the socket 16, including various processes for handling the heart-beat signal maintenance between the network-based camera 12 and the socket 16. These processes are known in the field and are self-explanatory.

It will be apparent to the skilled persons that the above processes are implemented on the respect network-based camera 12, the socket 16, and the video station 14 as software programs, and a skilled programmer would be able to produce appropriate software codes based on the current description and flow charts in the figures. Existing network-based camera 12, the socket 16, and the video station 14 with suitable hardware configuration with respect to processing power, storage, network connection capabilities implemented with processes of the current invention described herein in the form of software can practice the current invention. When performing the processes of the current invention, the processor will perform different functions at different times depending on which process is taking control of the processor at that time. That is, the processor is acting as various virtual devices each carrying out different processes of the current invention, for example a camera-advertising signal generator when the camera-advertising signal is sent from the network-based camera 12; a camera-identification tag acceptance determining device when determining whether the camera-identification tag is acceptable to the video station; locking status updater when the ownership of the network-based camera is to be locked with the respective connected socket 16; and so on.

While the preferred embodiment of the present invention has been described in detail by the examples, it is apparent that modifications and adaptations of the present invention will occur to those skilled in the art. Furthermore, the embodiments of the present invention shall not be interpreted to be restricted by the examples or figures only. It is to be expressly understood, however, that such modifications and adaptations are within the scope of the present invention, as set forth in the following claims. For instance, features illustrated or described as part of one embodiment can be used on another embodiment to yield a still further embodiment. Thus, it is intended that the present invention cover such modifications and variations as come within the scope of the claims and their equivalents.

The invention claimed is:

1. A method of connecting at least one network-based camera to a video station, said video station having at least one socket for connecting said network-based camera, said method including the steps of:
   a) sending a camera-advertising signal from the network-based camera to the video station for notifying the presence of the network-based camera, said camera-advertising signal includes a camera-identification tag for identification of the network-based camera;
   b) if the network-based camera is in an unlock state, locking ownership of the network-based camera with the respective connected socket; and
   c) if the network-based camera is in a lock state and is not locked by the respective socket, terminating connection between the network-based camera and the video station
   such that at any time, each of the at least one socket
   can lock ownership of only one network-based camera; and
   receives video from the only one network-based camera with ownership locked by the respective socket.

2. The method of claim 1 further including the steps of:
   a1) after receiving the camera-advertising signal, determining whether the camera-identification tag is acceptable to the video station; and
   a2) if the camera identification tag is not acceptable to the video station, terminating connection between the network-based camera and the video station.

3. The method of claim 1, wherein the steps b) and c) include the steps of
   sending an ownership-locking-query signal from the video station to the network-based camera for querying whether ownership of the network-based camera with the respective connected socket can be locked;
   after the network-based camera receives the ownership-locking-query signal,
      sending an accept-locking signal from the network-based camera to the video station if the network-based camera is in the unlock state; or
      sending a reject-locking signal from the network-based camera to the video station if the network-based camera is in the lock state and is not locked by the respective socket;
   if the accept-locking signal is sent from the network-based camera to the video station, locking ownership of the network-based camera with the respective connected socket and establishing a video connection for sending video from the network-based camera to the video station; and
   if the reject-locking signal is sent from the network-based camera to the video station or if the camera-identification tag is not acceptable to the video station, terminating connection between the network-based camera and the video station.

4. The method of claim 3, wherein the ownership-locking-query signal includes a lock key for decrypting data transmission between the network-based camera and the video station.

5. The method of claim 4 further including the step of broadcasting a station-discovery signal from the video station before the camera-advertising signal is sent from the network-based camera to the video station, said station-discovery signal including a station-identification tag for the identification of the video station.

6. The method of claim 5, wherein the ownership-locking-query signal further includes any one of the camera-identification tag, the station-identification tag, a set of assigned networking settings, or their combinations.

7. The method of claim 6, wherein the step of locking ownership of the network-based camera by the respective connected socket includes the steps of
   recording at least one of the following:
      recording the camera-identification tag at the respective connected socket; and
      recording the station-identification tag at the network-based camera
   selecting a set of unique networking settings at the video station as the assigned networking settings in the ownership-locking signal.

8. The method of claim 7 further including the step of updating the network-based camera with the set of assigned networking settings.

9. The method of claim 1, wherein the camera-advertising signal further includes any one of a set of camera networking settings, camera-locking status, or their combinations.

10. The method of claim 1 further including the steps of:
    sending a heart-beat signal from the network-based camera to the respective connected socket for maintaining ownership of the network-based camera with the respective connected socket; and
    if the heart-beat signal is not received within a predetermined period of time, unlocking ownership of the network-based camera with the respective connected socket and terminating connection between the network-based camera and the respective connected socket.

11. The method of claim 1, wherein the network-based camera is connected to said at least one socket through a network cable.

12. A video surveillance system having at least one network-based camera and a video station incorporating the method of claim 1.

13. A method of controlling connection between at least one network-based camera to a video station, a camera-advertising signal is sent from the network-based camera to the video station for notifying the presence of the network-based camera, said camera-advertising signal includes a camera-identification tag for identification of the network-based camera, said video station having at least one socket for connecting said network-based camera, said method including the steps of:
    1) if the network-based camera is in an unlock state, locking ownership of the network-based camera with the respective connected socket; and
    2) if the network-based camera is in a lock state and is not locked by the respective socket, terminating connection between the network-based camera and the video station
    such that at any time, each of the at least one socket
    can lock ownership of only one network-based camera; and
    receives video from the only one network-based camera with ownership locked by the respective socket.

14. The method of claim 13 further including the steps of:
    1a) after receiving the camera-advertising signal, determining whether the camera-identification tag is acceptable to the video station; and
    1b) if the camera identification tag is not acceptable to the video station, terminating connection between the network-based camera and the video station.

15. The method of claim 13, wherein the steps 1) and 2) includes the steps of:
    if the camera-identification tag is acceptable to the video station, sending an ownership-locking-query signal from the video station to the network-based camera for querying whether ownership of the network-based camera with the respective connected socket can be locked;

if an accept-locking signal from the network-based camera is received by the video station, locking ownership of the network-based camera with the respective connected socket and establishing a video connection for sending video from the network-based camera to the video station; and if a reject-locking signal from the network-based camera is received by the video station or if the camera-identification tag is not acceptable to the video station, terminating connection between the network-based camera and the video station.

16. The method of claim 15, wherein the ownership-locking-query signal includes a lock key for decrypting data transmission between the network-based camera and the video station.

17. The method of claim 16 further including the step of broadcasting a station-discovery signal from the video station before the camera-advertising signal is sent from the network-based camera to the video station, said station-discovery signal including a station-identification tag for the identification of the video station.

18. The method of claim 16, wherein the ownership-locking-query signal further includes any one of the camera-identification tag, the station-identification tag, a set of assigned networking settings, or their combinations.

19. The method of claim 18, wherein the step of locking ownership of the network-based camera by the respective connected socket includes the steps of recording the station-identification tag at the network-based camera; and selecting a set of unique networking settings at the video station as the assigned networking settings in the ownership-locking signal.

20. The method of claim wherein the network-based camera is connected to said at least one socket through a network cable.

21. A video station for a video surveillance system incorporating the method of claim 13.

22. A method of connecting at least one network-based camera to a video station, said video station:

having at least one socket for connecting said network-based camera, can locking ownership of the network-based camera with the respective connected socket if the network-based camera is in an unlock state, and provide the network-based camera with a lock key for decrypting data transmission between the network-based camera and the video station and can terminate connection between the network-based camera and the video station if the network-based camera is in a lock state and is not locked by the respective socket said method including the steps of:

a) sending a camera-advertising signal from the network-based camera to the video station for notifying the presence of the network-based camera, said camera-advertising signal includes a camera-identification tag for identification of the network-based camera;

b) recording the lock key at the network-based camera if an ownership-locking-query signal from the video station is received, and the network-based camera is in a unlock state such that at any time, each of the at least one socket can lock ownership of only one network-based camera; and receives video from the only one network-based camera with ownership locked by the respective socket.

23. The method of claim 22, wherein the ownership-locking-query signal is sent from the video station to the network-based camera for querying whether ownership of the network-based camera with the respective connected socket can be locked, said method further including the steps of:

after the network-based camera receives the ownership-locking-query signal, sending an accept-locking signal from the network-based camera to the video station if the network-based camera is in the unlock state; or sending a reject-locking signal from the network-based camera to the video station if the network-based camera is in the lock state and is not locked by the respective socket;

if the accept-locking signal is sent from the network-based camera to the video station, locking ownership of the network-based camera with the respective connected socket and establishing a video connection for sending video from the network-based camera to the video station; and if the reject-locking signal is sent from the network-based camera to the video station or if the camera-identification tag is not acceptable to the video station, terminating connection between the network-based camera and the video station.

24. The method of claim 23, wherein the ownership-locking-query signal further includes any one of the camera-identification tag, the station-identification tag, a set of assigned networking settings, or their combinations.

25. The method of claim 23, wherein the step of locking ownership of the network-based camera by the respective connected socket includes the step of recording the station-identification tag at the network-based camera.

26. The method of claim 25 further including the step of updating the network-based camera with the set of assigned networking settings.

27. The method of claim 22, wherein the camera-advertising signal further includes any one of a set of camera networking settings, camera-locking status, or their combinations.

28. The method of claim 22 further including the steps of:

sending a heart-beat signal from the network-based camera to the respective connected socket for maintaining ownership of the network-based camera with the respective connected socket; and if the heart-beat signal is not received within a predetermined period of time, unlocking ownership of the network-based camera with the respective connected socket and terminating connection between the network-based camera and the respective connected socket.

29. The method of claim 22, wherein the network-based camera is connected to said at least one socket through a network cable.

30. A network-based camera for a video surveillance system incorporating the method of claim 22.

\* \* \* \* \*

UNITED STATES PATENT AND TRADEMARK OFFICE
CERTIFICATE OF CORRECTION

| | | |
|---|---|---|
| PATENT NO. | : 8,976,262 B2 | Page 1 of 1 |
| APPLICATION NO. | : 13/994382 | |
| DATED | : March 10, 2015 | |
| INVENTOR(S) | : Ka Ho Ho et al. | |

It is certified that error appears in the above-identified patent and that said Letters Patent is hereby corrected as shown below:

IN THE CLAIMS

Column 13, line 36, (Claim 20) reads:

20. The method of claim wherein the network-based cam-

Should read:

20. The method of claim 13 wherein the network-based cam-

Signed and Sealed this
Second Day of June, 2015

Michelle K. Lee
*Director of the United States Patent and Trademark Office*